United States Patent [19]

Eaton, Jr.

[11] Patent Number: 5,117,177
[45] Date of Patent: May 26, 1992

[54] REFERENCE GENERATOR FOR AN INTEGRATED CIRCUIT

[75] Inventor: S. Sheffield Eaton, Jr., Colorado Springs, Colo.

[73] Assignees: Ramtron Corporation, Colorado Springs, Colo.; NMB Semiconductor Co., Ltd., Japan

[21] Appl. No.: 644,904

[22] Filed: Jan. 23, 1991

[51] Int. Cl.⁵ .............................................. G05F 3/20
[52] U.S. Cl. ................................... 323/314; 307/296.8
[58] Field of Search ............... 323/312, 313, 314, 315, 323/316; 307/296.1, 296.6, 296.8

[56] References Cited

U.S. PATENT DOCUMENTS

| | | | |
|---|---|---|---|
| 4,713,600 | 12/1987 | Tsugaru et al. | 323/314 |
| 4,788,455 | 11/1988 | Mori et al. | 323/314 |
| 4,958,086 | 9/1990 | Wang et al. | 323/314 |
| 4,978,905 | 12/1990 | Hoff et al. | 323/314 |

*Primary Examiner*—Peter S. Wong
*Attorney, Agent, or Firm*—Cook, Egan, McFarron & Manzo Ltd.

[57] ABSTRACT

A voltage reference generated for an integrated circuit which produces a source of reference voltage which is self-compensated for variations in operating voltage ($V_{cc}$) or in transistor threshold voltages ($V_T$). The circuit uses a voltage divider coupled between $V_{cc}$ and ground and has first and second FET transistors. A faced control circuit is coupled to control the conductivity of the first transistor, and the second control circuit is coupled to control the conductivity of the second transistor. The first control circuit produces a control voltage which varies as a function of variations in $V_{cc}$, while the second control circuit also provides a control voltage wherein variations are a function of variations in $V_{cc}$, but in an opposite direction. Hence, the second control voltage is configured so that variations in $V_{cc}$ cause the second transistor to compensate for changes in operation of the first transistor, so that the reference voltage remains substantially constant.

12 Claims, 1 Drawing Sheet

1

REFERENCE GENERATOR FOR AN INTEGRATED CIRCUIT

FIELD OF THE INVENTION

The present invention relates to integrated circuitry and specifically to reference generators used therein. More particularly, the present invention is directed to an integrated circuit reference generator that is independent of fluctuations in the operating voltage and other parameters.

BACKGROUND OF THE INVENTION

Integrated circuits generally receive a source of operating voltage from a power supply, and the operating voltage is usually called $V_{CC}$. Transistors, specifically field effect transistors, in the integrated circuit have operating characteristics which relate to a threshold voltage referred to as $V_T$. Reference circuits in general depend on the values of either or both of $V_{CC}$ and $V_T$. As used herein, "$V_T$" includes the threshold voltage for p-channel transistors, $V_{TP}$.

It is an object of the present invention to provide a reference generator for an integrated circuit that is relatively immune to variations in $V_{CC}$.

A further Object of the present invention is to provide a reference generator which is relatively immune to variations in $V_T$.

SUMMARY OF THE INVENTION

According to some aspects of the present invention, a voltage reference generator for an integrated circuit which receives a source of operating voltage includes a voltage divider having an internal node for providing an output reference voltage. The divider is coupled between a source of operating voltage ($V_{CC}$) and a reference potential (ground or $V_{SS}$). The divider includes first and second devices of controllable conductivity, such as field effect transistors. First and second control circuits are coupled to control the conductivity of the first and second devices, respectively.

The first control circuit provides a first control voltage wherein variations therein are a function of variations in the operating voltage. Similarly, the second control circuit provides a second control voltage wherein variations therein are a function of variations in the operating voltage. The second control circuit is configured so that variations in the operating voltage cause the second device to compensate for changes in the operation of the first device, so that the reference voltage developed at the node remains substantially constant.

The sources of error in this invention tend to cancel out, leaving a substantially constant reference voltage developed at the internal node of the divider circuit.

DESCRIPTION OF THE DRAWINGS

In describing the present invention, reference is made to the accompanying drawings wherein.

DESCRIPTION OF THE PREFERRED EMBODIMENT

Figure 1:
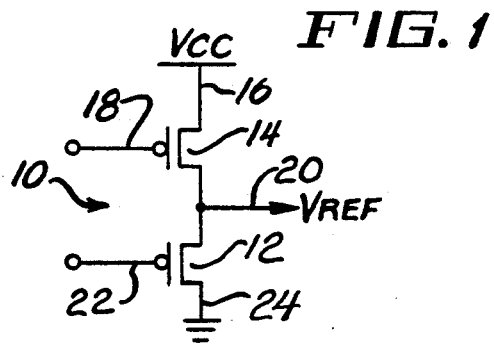
FIG. 1 shows a circuit according to the present invention.

As shown in FIG. 1, a reference generator circuit 10 comprises a voltage divider which illustratively uses a pair of p-channel transistors ("FETs") 12 and 14 having their source-drain paths coupled in series between a source of operating voltage $V_{CC}$ supplied at 16 and a reference potential, in this case ground. FET 14 has a gate electrode 18 and a node 20 at its drain. FET 12 has its source coupled to node 20 and its drain 24 grounded; a gate electrode 22 receives an input from FIG. 4. Gate electrode 18 receives an input from FIG. 3.

Nominally, $V_{CC}$ will be five volts. The gate electrode 18 which controls the conductivity of transistor 14 will nominally be at $V_{CC}$ minus $V_{TP}$, i.e., nominally four volts, where $V_{TP}$ stands for a voltage threshold for a p-channel transistor (nominally 1 volt). The voltage on gate electrode 22 of transistor 12 will be controlled to $-V_{TP}$, i.e., nominally minus one volt. If the threshold voltage of a p-channel transistor changes for any reason, the thresholds of both transistor 12 and transistor 14 will be changed.

It is desired to keep both transistors 12 and 14 ON for all values of $V_{CC}$ and all values of $V_T$. It is further desired to obtain a constant current through the source-drain paths of transistors 12 and 14. These objects are obtained in the circuit 10. It is preferred to use two p-channel transistors rather than a p-channel and an n-channel transistor because the number of variables is thereby reduced. If the value of $V_T$ changes, it changes for both FET 12 and 14, and each of these transistors will draw the same amount of current. Accordingly, the output voltage $V_{REF}$ taken from node 20 remains constant even when $V_T$ changes.

Transistor 14 is normally ON since, by design, its gate is a $V_{TP}$ below its source. Similarly, the gate of FET 12 is normally one $V_{TP}$ below ground, so for all non-negative values of its source, node 20, FET 12 is ON. It is desired to keep these two FETs 12, 14 ON by the same amounts for all $V_{CC}$ and all $V_{TP}$ values.

It should also be noted that two n-channel transistors could be used with a direct reversal. The upper n-channel transistor of FIG. 1 would have its gate electrode tied to a voltage pumped one $V_T$ above $V_{CC}$ and the lower n-channel transistor would have its gate electrode tied to a voltage one $V_T$ above ground.

Figure 2:
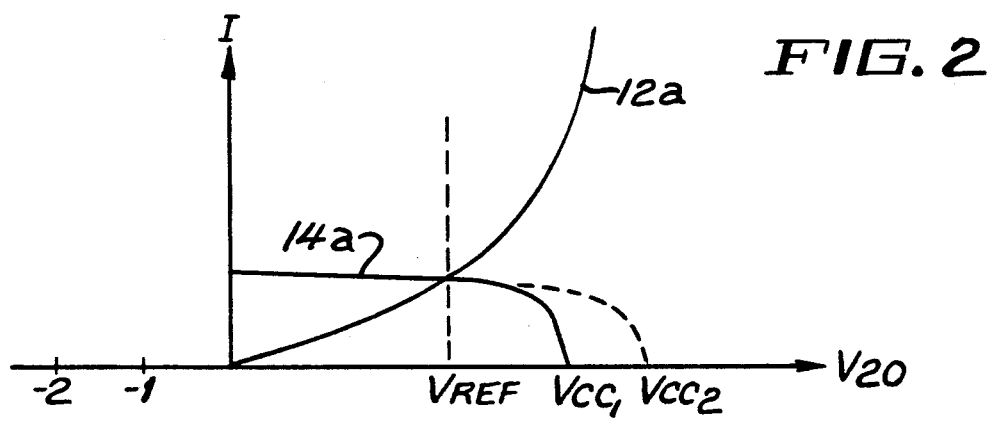
FIG. 2 is useful in understanding the operation of the FIG. 1 circuit, and shows various currents drawn in circuit 10 of FIG. 1.

FIG. 2 shows a current versus voltage chart (I-V curves) for some of the elements in FIG. 1. Curve 12a shows the current drawn through transistor 12 with increasing voltage applied to node 20, which is the source electrode of transistor 12, assuming that a voltage of $-V_{TP}$ is applied to the gate electrode 22 of transistor 12. When node 20 is at 0 volts, no current is drawn since the drain is also grounded. As is well known, a p-channel transistor such as FET 12 and FET 14 is ON if the gate voltage is below the source voltage by at least one threshold voltage, $V_{TP}$. As can be seen, the current through the source-drain path of transistor 12 increases with increasing source voltage.

Similarly, the current through transistor 14 is represented by curve 14a, a traditional constant current diagram. In this case, since the voltage on the x-axis represents the voltage at node 20, that corresponds to the drain voltage of transistor 14. This curve assumes that the voltage applied to the gate of transistor 14 is one $V_{TP}$ below $V_{CC}$. Obviously, if the drain voltage ever reaches $V_{CC}$, then there is no voltage differential between source and drain, so no current will be conducted through transistor 14. Otherwise, the current drawn through transistor 14 is relatively constant. The slope of curve 14a should be flat in the saturation region. A broken line curve is shown in FIG. 2 to show that if $V_{CC}$ changes to a higher value, such as $V_{CC2}$, the curve 14a will simply be extended toward the right. Curve 14a intersects curve 12a at a reference voltage which corresponds to the voltage developed on node 20.

Considering the circuit further, it will be recalled that the current I through a p-channel FET is proportional to $(V_{GS}-V_{TP})$, where $V_{GS}$ is the gate to source voltage. If the source is at $V_{CC}$ and the gate is precisely one $V_{TP}$ below $V_{CC}$, then $V_{GS}$ equals $V_{TP}$. The current through transistor 14 would then be proportional to $(V_{TP}-V_{TP})$, or zero. To make FET 14 turn ON, therefore, its gate voltage must really differ by some amount $\epsilon$ from $V_{CC}-V_{TP}$. Preferably, this amount $\epsilon$ will remain constant even when $V_{CC}$ varies.

The position of curve 12a on the x-axis is independent of the threshold voltage $V_T$ because of the assumptions concerning the gate electrode voltages. The value $V_{TP}$ does not enter into the equation, nor does the exact value of $V_{CC}$. The curve will always pass through the origin of FIG. 2 if a negative $V_{TP}$ is applied to the gate of FET 12.

The channel lengths of transistors 12 and 14 are preferred to be equal and relatively long. Illustratively, these will have channel lengths of three microns. The width of the gate electrode of transistor 12 may be one micron, but the width of the gate electrode of transistor 14 is preferably 55 microns. By providing long channel lengths, a flat saturation range is obtained.

On transistor 14, the gate to source voltage difference is equal to $V_T$, which remains constant as $V_{CC}$ changes, since the gate electrode 18 is held at one $V_T$ below $V_{CC}$.

Since the devices 12 and 14 draw current independent of (a non-zero) $V_{CC}$, the value $V_{REF}$ is independent of $V_{CC}$. Note further that curve 12a does not ideally change when the value of $V_T$ changes, because the curve always starts drawing current at zero volts.

Figure 3:
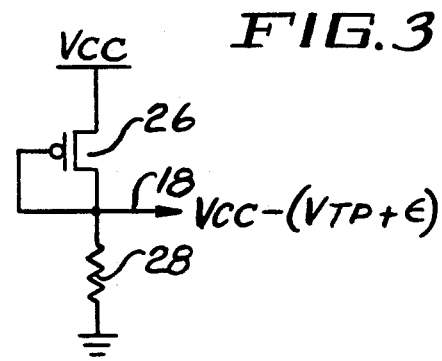
FIG. 3 shows a first control circuit for the FIG. 1 circuit.

FIG. 3 shows a circuit comprising a transistor 26 and resistance 28. The source-drain path of transistor 26 is coupled in series with resistance 28 between a source of operating voltage and a reference potential in this case $V_{CC}$ and ground respectively. Preferably, transistor 26 is a p-channel transistor having dimensions of 40 microns width and three microns length. The gate electrode of transistor 26 is coupled to its drain at a node 18 which is also shown in FIG. 1. The voltage produced at node 18 will be $V_{CC}$ minus $[V_{TP\epsilon}]$. Essentially, the voltage provided by the circuit of FIG. 3 to node 18 will be slightly more than one threshold voltage below $V_{CC}$. Resistance 32 may be illustratively 200,000 $\Omega$ (ohms).

Figure 4:
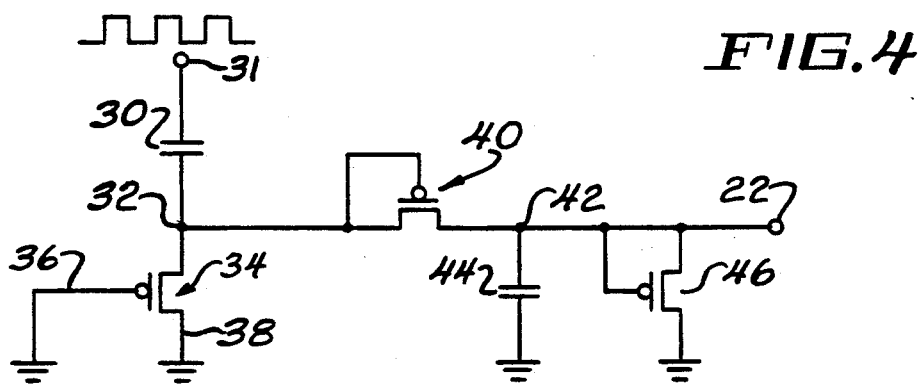
FIG. 4 shows a second control circuit for the FIG. 1 circuit.

The circuit of FIG. 4 is preferred to provide a negative $V_{TP}$ at node 22 of FIG. A capacitor 30 of illustratively 0.2 picofarads has an input 31 which is coupled to receive a square wave illustratively of ten megahertz (other frequencies can be used as are convenient) which experiences voltage transitions of $V_{CC}$. This square wave is coupled by capacitor 30 to a node 32. A p-channel transistor 34 with its source coupled to node 32 ensures that the voltage on node 32 cannot rise more than one p-channel threshold voltage ($V_{TP}$) above ground since its gate electrode 36 and drain electrode 38 are grounded. Illustratively, transistor 34 may be a p-channel FET that is thirty microns wide and 1.5 microns long.

On the trailing edge of the square wave applied to input 31, the voltage at node 32 drops to $[V_{TP}-V_{CC}]$. A diode-connected transistor 40 isolates a node 42 from node 32; preferably transistor 40 is a p-channel FET. A charge pump is formed, including a capacitor 44 and a further preferably p-channel transistor 46. Transistor 46 has its gate electrode and source electrode both coupled to node 42, which provides the output 22. The drain electrode of transistor 46 is coupled to ground, and device 46 forms a diode which prevents node 42 from dropping below negative $V_{TP}$. When a downward edge occurs on input 31, node 42 is coupled to negative $V_{TP}$ and is clamped there by FET 46. When a rising edge occurs on the square wave, node 42 is isolated from the rising edge by transistor 40. Thus, node 42 and consequently node 22 coupled thereto are fixed at substantially $-V_{TP}$.

The reference circuit which has been described is dependent on the current flowing through transistors 12 and 14 of FIG. 1. The circuits have been configured so that sources of error generally cancel out. The gate voltage of transistor 14 is equal to $V_{CC}-[V_{TP}+\epsilon]$ and epsilon $\epsilon$ is a function of $V_{CC}$. However, from FIG. 3, as $V_{CC}$ increases, $\epsilon$ increases and the current through transistor 14 rises. If the current through transistor 12 rises correspondingly, then the voltage at node 20, $V_{REF}$ remains constant.

Accordingly, the output of FIG. 4 controls the gate electrode voltage of transistor 12. It should be constructed so that as $V_{CC}$ rises, a more negative voltage appears at node 22. This is done by proper sizing of transistor 46 which illustratively is 16 microns wide and three microns long. Transistor 40 illustratively is 15 microns wide and 1.5 microns long, and capacitor 44 is illustratively 0.1 picofarads.

Figure 5:
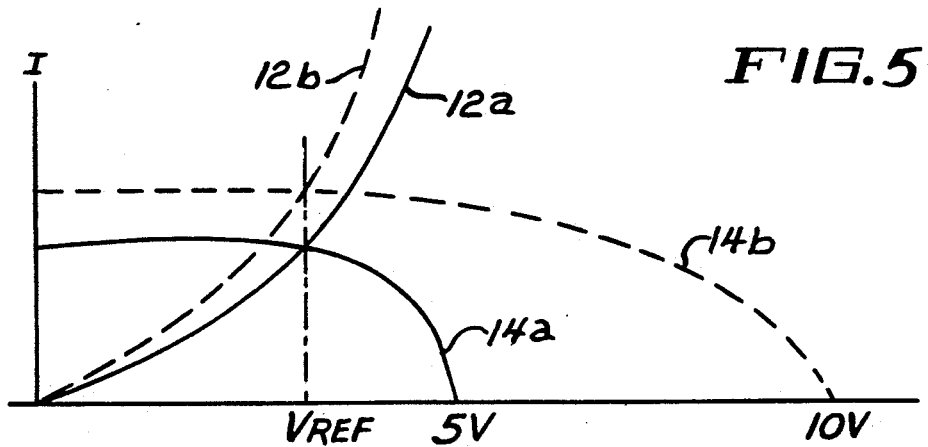
FIG. 5 is a sketch illustrating how the present invention compensates for variations in both power supply voltage and threshold voltage.

FIG. 5 shows the effect of the present circuit. Curves 12a and 14a intersect at the reference voltage $V_{REF}$. The idea of the present circuit is that if $V_{CC}$ drifts, curves 12b and 14b will result, but they will intersect at $V_{REF}$ also. If $V_{CC}$ rises, the current through the resistor 28 of FIG. 3 will also rise to some extent. Thus, it is seen that curve 12a needs to be shifted to the left so that more current should be drawn by transistor 12 if $V_{CC}$ should increase. This compensation effect occurs by virtue of the circuit of FIG. 4 where node 32 is driven further below ground if $V_{CC}$ rises, since the square wave has a transition of $V_{CC}$. If transistor 46 had no resistance at $V_{TP}$, then node 22 would stay at $-V_{TP}$. But because the voltage at node 32 goes lower with increasing $V_{CC}$, transistor 46 allows node 22 to drop below $-V_{TP}$ by exactly the correct amount to compensate for any change in $V_{CC}$. Transistor 46 is sized experimentally through simulations so that as $V_{CC}$ increases, $-V_{TP}$ is not obtained at node 22 but rather $V_{TP}-\epsilon$ obtains. This causes a more negative value on gate 22 causing a greater current to be drawn through FET 12 to offset the greater current through FET 14.

It will now be appreciated that what has been described is a simple but effective reference voltage generator for an integrated circuit which compensates for variations in both $V_{CC}$ and threshold voltage $V_T (V_{TP})$.

It will be appreciated that the present disclosure is intended to be illustrative and that various modifications can be made within the scope and spirit of the present invention.

I claim:

1. A voltage reference generator for an integrated circuit which receives a source of operating voltage comprising:

a voltage divider having a node for providing an output reference voltage, the divider being coupled between a source of operating voltage and a reference potential, the divider including first and second devices of controllable conductivity;

a first control circuit coupled to control the conductivity of said first device and a second control circuit coupled to control the conductivity of said second device;

said first control circuit providing a first control voltage which is one threshold voltage plus a first variable voltage below the operating voltage wherein variations therein are a function of variations in the operating voltage;

said second control circuit providing a second control voltage which is equal to a negative threshold voltage minus a second variable voltage wherein variations therein are a function of variations in the operating voltage, said second control voltage being configured so that variations in said operating voltage cause said second device to compensate for changes in the operation of said first device, so that the reference voltage developed at said node is independent of changes in the operating voltage and the threshold voltages of the first and second devices of controllable conductivity and is substantially constant.

2. The circuit of claim 1 wherein said first and second devices comprise first and second p-channel transistors, each having a respective gate electrode coupled to receive a corresponding control signal from said control circuits.

3. The circuit of claim 1 wherein said first control circuit comprises a third transistor coupled to the operating voltage and configured to provide said first control voltage.

4. The circuit of claim 3 wherein said third transistor comprises a p-channel transistor having a gate electrode coupled to its drain and its source coupled to receive the operating voltage, and said control circuit further comprises a resistance coupled between said drain and reference potential, thereby to provide said first control voltage at a node coupled to said drain.

5. The circuit of claim 2 wherein said second control circuit comprises a charge pump.

6. The circuit of claim 5 wherein said second control circuit is configured to provide a second control voltage substantially equal to a negative p-channel threshold voltage.

7. The circuit of claim 6 wherein said first control voltage is substantially equal to one threshold voltage below the operating voltage.

8. A voltage reference generator for an integrated circuit which receives a source of operating voltage comprising:

a voltage divider having a first node for providing an output reference voltage, the divider being coupled between a source of operating voltage and a reference potential, the divider including first and second p-channel transistors of controllable conductivity, said first node being coupled between said first and second transistors;

a first control circuit coupled to control the conductivity of said first transistor and a second control circuit coupled to control the conductivity of said second transistor;

said first control circuit providing a first control voltage wherein variations therein are a function of variations in the operating voltage, said first control circuit comprising a third p-channel transistor having its gate electrode and its drain coupled to a second node and its source coupled to receive the operating voltage, said control circuit further comprising a resistance coupled between said second node and reference potential, thereby to provide said first control voltage at said second node;

said second control circuit providing a second control voltage wherein variations therein are a function of variations in the operating voltage, said second control circuit being configured so that variations in said operating voltage cause said second transistor to compensate for changes in the operation of said first transistor, so that the reference voltage developed at said first node remains substantially constant, said second control circuit including a third node coupled to receive an oscillating waveform, a first clamp between said third node and reference potential, a fourth node, a second clamp coupled between said third and fourth nodes, and a third clamp coupling said fourth node to said reference potential so that a substantially constant voltage is produced at said fourth node, said fourth node being coupled to said first node.

9. The circuit of claim 8 wherein said second control voltage is substantially equal to one p-channel threshold voltage below the reference potential and said first control voltage is substantially equal to one p-channel threshold voltage below the operating voltage.

10. A method of generating a reference voltage in an integrated circuit comprising the steps of:

applying a source of operating voltage ("$V_{CC}$") to the source-drain path of a first field effect transistor ("FET") which is coupled in series with one side of the source-drain path of a second FET;

applying a reference potential to the other side of the source-drain path of the second FET;

applying a voltage to the gate electrode of the first FET that is substantially equal to $V_{CC}$ minus a threshold voltage for the first transistor;

applying a voltage to the gate electrode of the second FET that is substantially equal to a negative threshold voltage of the second FET; and obtaining the reference voltage from a node between said first and said second FETs, wherein the reference voltage is a constant value which is independent of variations in the operating voltage and the threshold voltage of the first FET and the second FET.

11. An integrated circuit voltage reference generator which is coupled to a means to receive an operating voltage and a means which outputs a reference voltage that is independent of variations in the operating voltage and variations in the threshold voltage.

12. The circuit of claim 8 wherein the reference voltage is a constant value which is independent of variations in the threshold voltage of the first and second p-channel transistors.

* * * * *